No. 611,203. Patented Sept. 20, 1898.
F. A JOHNSON.
MACHINE FOR COMPOSING PRINTED MATTER.
(Application filed June 23, 1893.)
(No Model.) 7 Sheets—Sheet I.

Fig. 1.

Witnesses
Jno. G. Hinkel
Will E. Neff

Inventor
F. Amos Johnson
By J. A. Watson
atty

No. 611,203. Patented Sept. 20, 1898.
F. A JOHNSON.
MACHINE FOR COMPOSING PRINTED MATTER.
(Application filed June 23, 1893.)
(No Model.) 7 Sheets—Sheet 5.

No. 611,203. Patented Sept. 20, 1898.
F. A. JOHNSON.
MACHINE FOR COMPOSING PRINTED MATTER.
(Application filed June 23, 1893.)

(No Model.) 7 Sheets—Sheet 6.

Witnesses
Jno. G. Hinkel
Will E. Neff

Inventor
F. Amos Johnson
By J. H. Watson
Atty

No. 611,203. Patented Sept. 20, 1898.
F. A JOHNSON.
MACHINE FOR COMPOSING PRINTED MATTER.
(Application filed June 23, 1893.)

(No Model.) 7 Sheets—Sheet 7.

UNITED STATES PATENT OFFICE.

FRANK AMOS JOHNSON, OF PHILADELPHIA, PENNSYLVANIA, ASSIGNOR TO THE TACHYTYPE MANUFACTURING COMPANY, OF MINNEAPOLIS, MINNESOTA.

MACHINE FOR COMPOSING PRINTED MATTER.

SPECIFICATION forming part of Letters Patent No. 611,203, dated September 20, 1898.

Application filed June 23, 1893. Serial No. 478,649. (No model.)

*To all whom it may concern:*

Be it known that I, FRANK AMOS JOHNSON, a citizen of the United States, residing at Philadelphia, in the county of Philadelphia and State of Pennsylvania, have invented certain new and useful Improvements in Machines for Composing Printing-Surfaces, of which the following is a specification.

My invention relates to machines for composing printed matter.

It is herein illustrated and described as a matrix-making machine; but some important features of the invention are equally applicable to type-setting machines, linotype-machines, and type casting and composing machines. Therefore while I shall limit the description of the invention for illustration to a matrix-making machine it will be understood that I desire protection for the various elements of the invention which will cover all uses to which they may be applicable.

Among the principal features of the invention may be enumerated, first, a set of types or dies arranged in rows in a frame, the normal position of which frame is that in which the impression-plunger is over its middle point, by which arrangement the dies are brought to the impression-point with the least average amount of movement; second, constantly-moving devices for selecting the proper types or dies, which devices are normally without effect upon the die-frame, permitting it to remain in its central position, and which are brought into action to select a die by means of switches, which throw said devices out of their normal and inoperative paths; third, a dummy having movable parts representing a line of matter arranged to control the switches of the die-selecting devices and, if necessary, other movable parts arranged to control the spacing and justifying mechanism; and fourth, a series of removable and interchangeable duplicate dummies, each provided with pins or other adjustable parts which may be arranged to represent a line of printed matter and which in turn is adapted to transfer its representation to the dummy proper.

The various elements of my machine are as usual mounted in a suitable main frame A and operated through suitable connections by a power-shaft B, provided with a driving pulley or wheel $b$.

The plunger or impression device H is operated by toggle-levers $h$, one of which is mounted on a rock-shaft $h'$, which is vibrated by means of an arm $h^2$, link $h^3$, cam-lever $h^4$, and cam $h^5$. The cam-lever is held in contact with the cam by means of a spring $h^6$. In the machine illustrated the power-shaft is kept constantly running and the impression-plunger makes two downward strokes for each revolution of the shaft. One of these strokes takes place while a blank space $a$ at the center of the die-frame is opposite the plunger, and the other stroke takes place while a die is centered under the plunger or while another blank $b$, which represents the space in the line, is under a plunger.

The die-frame I contains a font consisting of any desired number of types or dies, preferably spring-seated and arranged in a series of rows. This die-frame is arranged to slide in guides in a secondary frame $i'$, which in turn slides in guides $i^2$ upon the main frame, the line of movement of the secondary frame being at right angles to that of the die-frame I. By positioning one of said frames any desired row of dies may be selected and by positioning the other frame any desired type in said row may be selected. Thus the frame is susceptible of a universal horizontal movement by which any die may be brought to the impression-point beneath the plunger.

Figure 1:
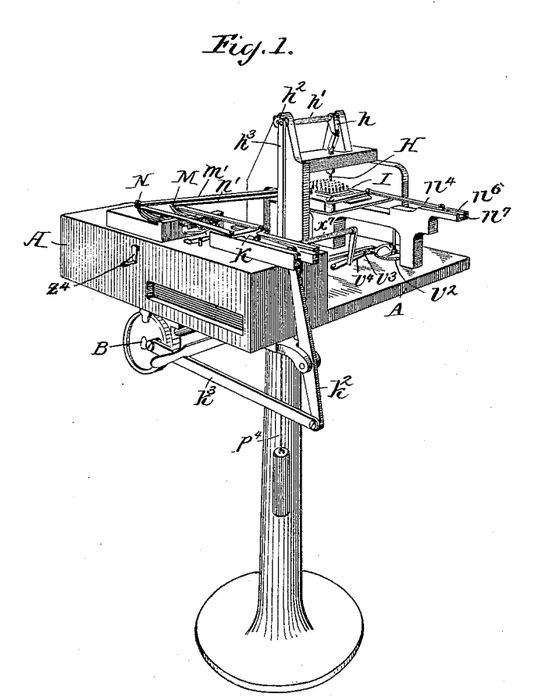
Figure 1 is a perspective view of a machine embodying the features of my present invention.

K represents a cross-head which is constantly reciprocated in fixed guides $k$ by means of a link $k'$, lever $k^2$, and pitman $k^3$, the latter being pivoted at $k^4$ to a crank-disk $k^5$ upon the power-shaft. The cross-head K is connected with the secondary frame $i'$ by means of links $m\ m'$, which are connected by a pivot-pin M, extending downward into guide-channels $m^3$, formed by a series of switch-rails, which will be presently described. The die-frame I is connected with the cross-head K by means of connecting-links $n\ n'$, elbow $n^2$, and links $n^4\ n^5$. The links $n^4\ n^5$ are pivoted to a block $n^6$, sliding in guides $n^7$. The links $n\ n'$ are connected by a pin N, similar to the pin M, which extends downward into channels $n^3$, similar to the channels $m^3$. The links $n\ n'$ are broken away in Fig. 2 to show the channels underneath, but they will be found complete in Fig. 1.

Figure 4:
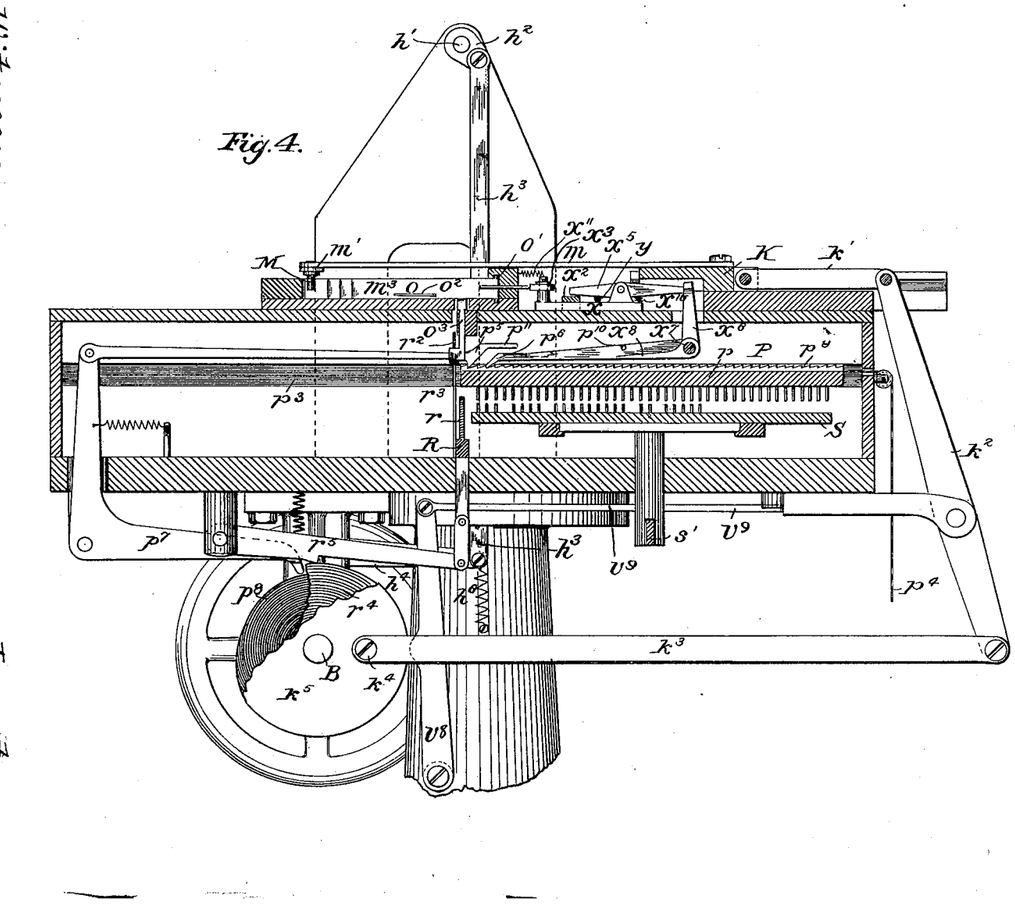
Fig. 4 is a sectional elevation on the line 4 4 of Fig. 3.

The guide-channels $m^3\ n^3$ are formed by a series of rails $o$, which are pivoted at their rear ends $o'$, as best seen in Fig. 4. The central guide-channels are circular, being coincident with the peripheries of circles having radii equal to the lengths of the links $m'\ n'$, respectively. It will thus be seen that if the guide-pins M N run in the central channels no motion will be communicated to the die-frame, although the cross-head K be kept continuously reciprocating. Springs $o^2$ normally keep the central channels open and operative and the side channels closed.

Figure 2:
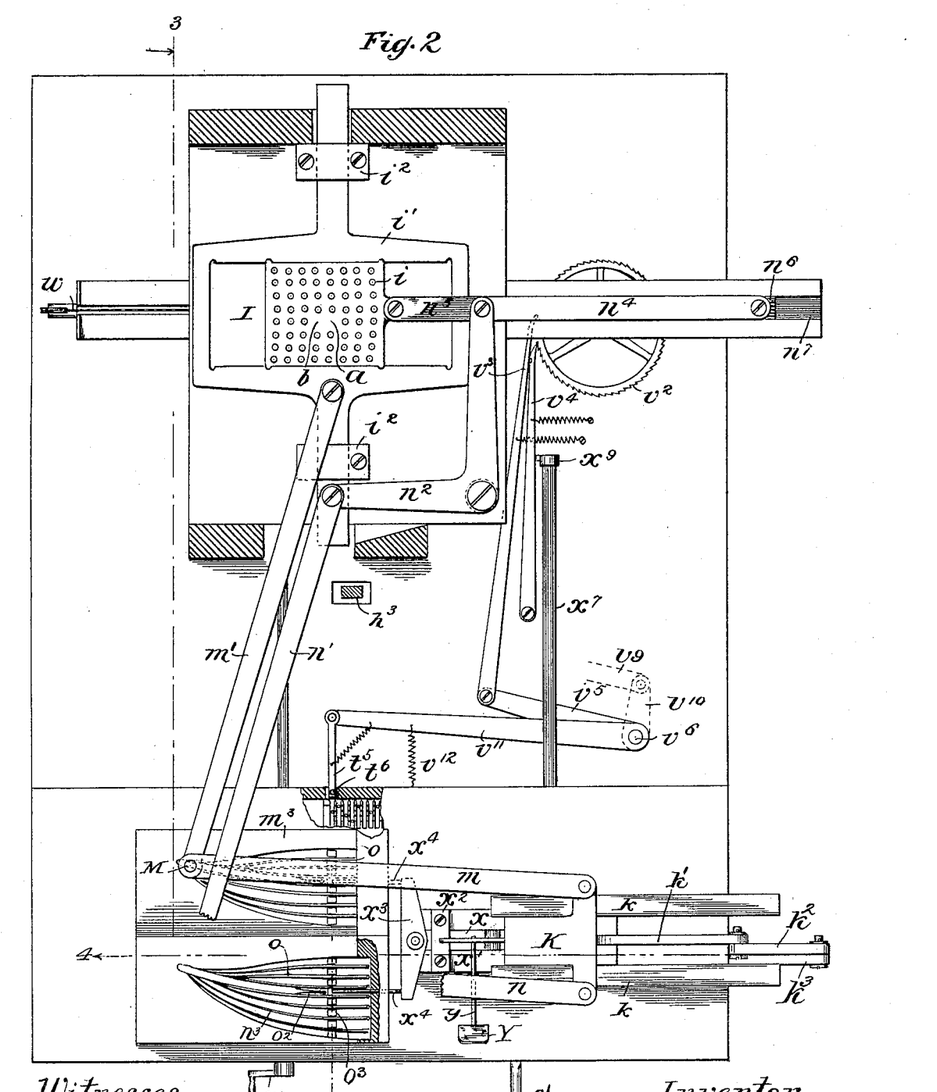
Fig. 2 is a plan view of the machine, the impression device, its supports, and some other portions being removed.
Figure 11:
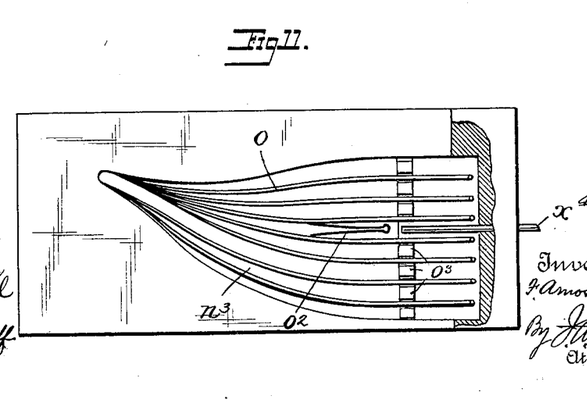
Fig. 11 is a plan view of a set of switches with a side switch set.

Below the rails $o$ are situated a series of switch-pins $o^3$, which are adapted to be driven up between the rails to close the central channel and open any other of the guide-channels desired, according to the switch-pin selected. In Fig. 2 the switch-pins are all down and the central channels are held up by means of springs $o^2$, while in Fig. 11 one of the side channels is kept open by means of a switch-pin which has been forced up. As all of the rails are pivoted and controlled by a single spring, it will be evident that the forcing up of any one of the switch-pins will open its corresponding channel and close all of the other channels. Thus by throwing up one or two switch-pins the guide-pins M N may be diverted into any pair of the channels $m^3\ n^3$, with the effect of bringing the corresponding die to the printing-point. It will be obvious that there should be as many channels $m^3$ as there are rows of dies in one direction and as many channels $n^3$ as there are rows of dies in the other direction. Thus, as shown in Fig. 2, any one of sixty-four dies can be brought to the impression-point by two sets of guide-channels, each set consisting of eight channels provided with seven switch-pins. When the machine is in operation, one or two of the switch-pins $o^3$ are raised at each revolution of the driving-shaft and held up until their corresponding die has been brought under the plunger and operated on, after which they are drawn back into their depressed positions. Before describing the mechanism for raising the switch-pins it will be necessary to describe the dummy-line, which selects the pins to be raised.

The dummy-line P consists, as shown, of a board or plate $p$, having a number of transverse rows of pins, each pin $p'$ being held frictionally in a perforation by a suitable spring $p^2$, which is sufficiently strong to keep the pin in any position in which it may be placed. The dummy-line is movable in guides $p^3$ in the main frame and, as shown in Fig. 4, has a tendency to move to the right, imparted to it by a cord and weight $p^4$. It is moved positively to the left step by step by means of a moving pawl $p^5$ and a holding-pawl $p^6$. The former pawl is continuously operated by means of an elbow-lever $p^7$ and a cam $p^8$. (Shown in Fig. 3.) The ratchet $p^9$ is provided with teeth spaced corresponding to the rows of pins, so that each movement of the dummy due to one tooth of the rack will bring a new row of pins into operation.

Figure 6:
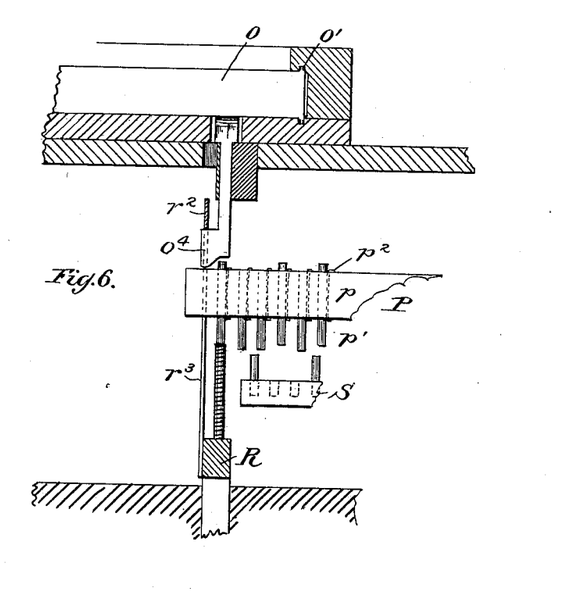
Fig. 6 is a view of a portion of Fig. 4 enlarged and showing the parts in different positions.

Below the switch-pins $o^3$ is a frame R, carrying a series of flexible plungers $r$, which plungers are preferably formed of closely-coiled wire. These plungers yield laterally, but are rigid longitudinally. They correspond in number with the switch-pins and are located directly under them, but sufficiently below them to permit the dummy to pass in between. The dummy-pins are normally down, with their lower ends slightly below the upper ends of the spring-plungers when the latter are at their lowest limit. When the dummy-pins are down in their normal or lowest positions, if the dummy-line be fed forward the pins will push the flexible plungers to one side and will not be affected by them; but if a dummy-line pin is raised a slight distance, sufficient to pass over the top of the flexible plunger $r$, then the blow of the plunger will not be diverted, but will raise the pin and force up the corresponding switch-pin. It will thus be seen that by slightly raising certain pins of the dummy they will be interposed between the flexible plungers and the switch-pins as the dummy is fed along, and in this way any desired combinations of switch-pins may be thrown up and any desired sequence of dies selected. A yoke $r^2$ is connected by rods $r^3$ to the frame R, and the switch-pins are provided with feet which extend under the yoke $r^2$, which yoke draws down the switch-pins immediately after they have performed their work upon the switch-rails. (See Fig. 6.) The flexible plungers $r$ are raised once during each revolution of the power-shaft by means of a cam $r^4$ and a cam-lever $r^5$.

Figure 9:
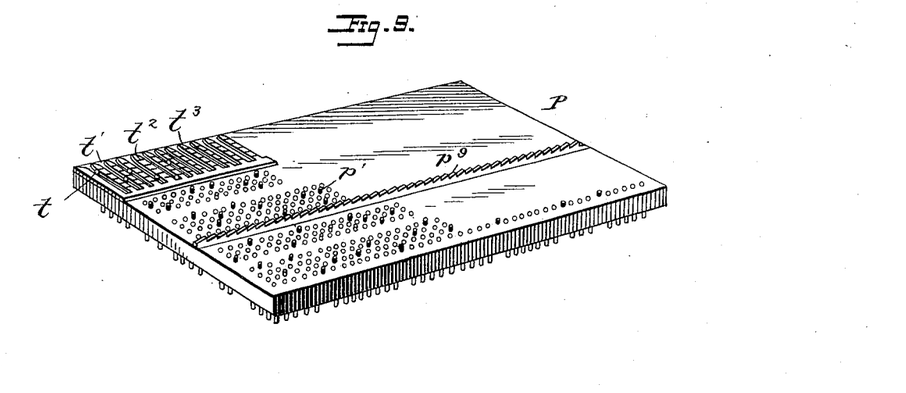
Fig. 9 is a perspective view of the dummy set to represent a line of matter.
Figure 10:
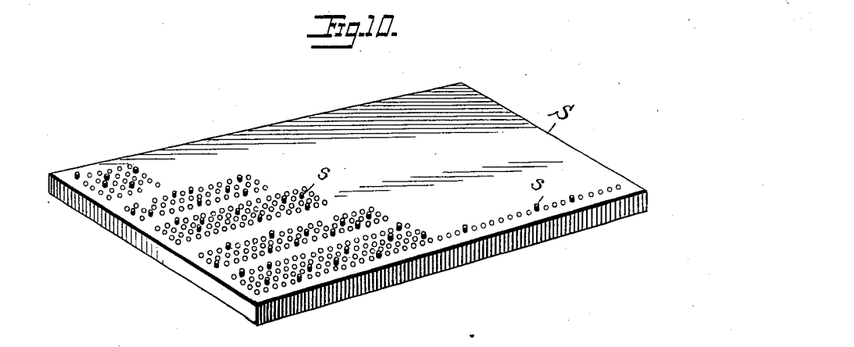
Fig. 10 is a perspective view of a duplicate dummy similarly set.

The dummy proper, P, as shown in perspective in Fig. 9, contains a series of transverse rows of pins $p'$, there being a sufficient number of rows to equal the greatest number of characters and spaces that may occur in a line of matter to be composed. In each row there are pins corresponding to the row of switch-pins, and also additional pins for spacing and justifying, which will be described hereinafter. Beneath the dummy P, at the right-hand side of the machine, is a duplicate dummy S. The duplicate dummy S might be a permanent portion of the machine; but I prefer to provide a number of removable and interchangeable duplicate dummies. As shown in Figs. 4 and 10, the duplicate dummy consists of a plate or block having rows of perforations corresponding exactly to the pins of the dummy proper. In these perforations are placed pins which correspond with the letters to be selected for a line and the widths of the letters and spaces in the line. After the duplicate dummy is placed in the machine exactly under the dummy proper it is raised by means of a lever $s'$, pivoted to the main frame at $s^2$, and its pins $s$ raise the corresponding pins $p'$ of the dummy proper and they in turn come into action to raise the switch-pins, as above described. Instead of the pins $s$ in the duplicate dummy (which in the present instance are set by hand) I may use other movable devices, which may be set either by hand or mechanically. Therefore in claiming a series of removable and interchangeable duplicate dummies I do not wish to be limited to the particular kind illustrated.

Figure 7:
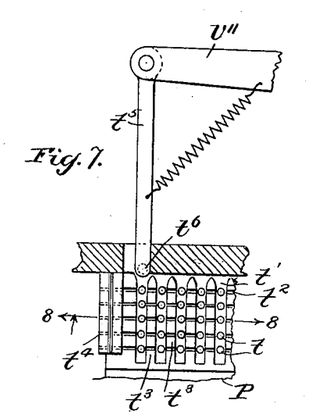
Fig. 7 is a view of a portion of Fig. 2 enlarged.
Figure 8:
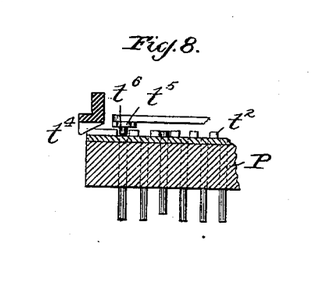
Fig. 8 is a sectional view taken on the line 8 8 of Fig. 7.

At one side of the dummy proper is shown a series of short rows of pins, each row consisting of five pins $t$. When the width of a letter or space is less than the maximum, one of the pins $t$ in the corresponding row is projected by the duplicate dummy, and this pin comes into action at the proper time to limit the movement of the matrix-feeding device. The pins $t$ are arranged in bell-mouthed grooves $t'$, (see Figs. 7 and 8,) and in line with the longitudinal rows of pins $t$ are transverse grooves $t^2$ across the ridges $t^3$ between the grooves $t'$. As the dummy travels along from right to left the spacing-pins, which have been raised and have performed their work of controlling the feeding mechanism, are returned by a series of fixed inclines $t^4$, which run in the grooves $t^2$, as shown in Fig. 8.

Figure 5:
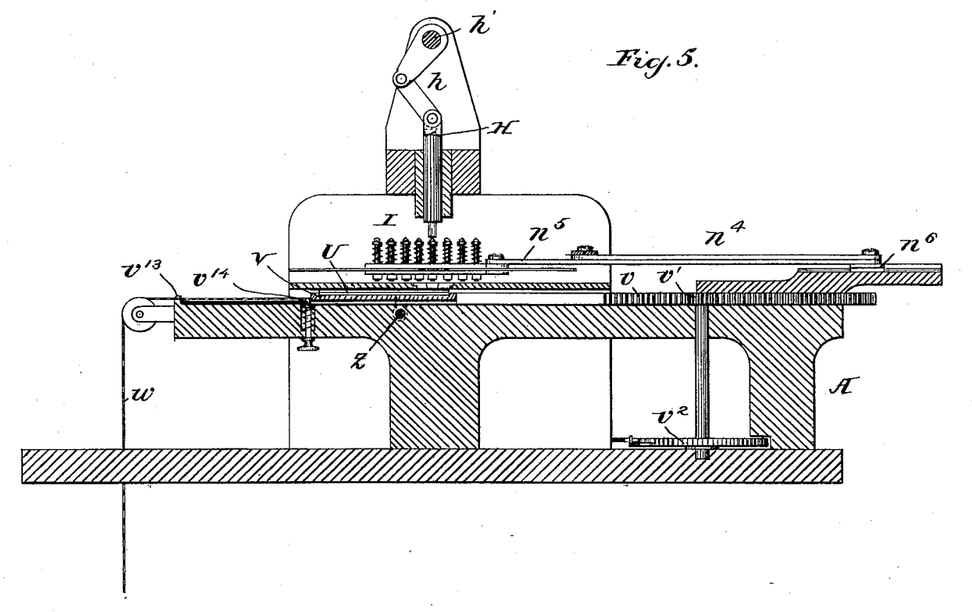
Fig. 5 is a sectional elevation on the line 5 5 of Fig. 3.

The matrix material U is supported in a carriage V, which is moved to space letters and quads by a rack $v$ and pinion $v'$. (See Fig. 5.) The pinion $v'$ is driven by a ratchet-wheel $v^2$, into which works a moving-pawl $v^3$ and a holding-pawl $v^4$. The moving-pawl $v^3$ is connected to an arm $v^5$ upon a rock-shaft $v^6$, (see Figs. 2 and 3,) which rock-shaft is moved by a cam $v^7$ through the medium of a cam-lever $v^8$, connecting-link $v^9$, and rock-arm $v^{10}$. A third arm $v^{11}$ at the upper end of the rock-shaft is connected to the main frame by a spring $v^{12}$, which tends to draw the cam-lever against the cam. If the movement of the arm $v^{11}$ were not obstructed, the carriage would be given its maximum feed at each revolution of the power-shaft. At the outer end of the arm $v^{11}$, however, is a pivoted arm $t^5$, which has a downward-projecting pin $t^6$, adapted to enter the bell-mouthed grooves $t'$ in the dummy. At each revolution of the power-shaft the spring $v^{12}$ draws the pawl $v^3$ backward until the motion of the pin $t^6$ is limited by one of the stop-pins $t$ of the dummy. It will be evident that if the outer pin $t$ of a row is raised the motion of the pawl $v^3$ will be limited to a single tooth of the wheel $v^2$. If the second pin is raised, the wheel $v^2$ will be moved two teeth, &c., and if none of the pins $t'$ are raised in a groove the stop-pin $t^6$ will run to the rear end of the groove and the maximum feed will be given to the matrix-carriage at the following revolution of the cam-shaft. Thus we see that by raising one, two, or three of the pins in each transverse line of the dummy we may select any line of characters and properly space and justify the same. A movable stop $v^{14}$ limits the movement of the carriage V when it is drawn back by the weight and holds it in position to start a line of print. When it is necessary to replace the matrix material, the stop $v^{14}$ is withdrawn and the carriage is permitted to run back against a fixed stop $v^{13}$, in which position the entire carriage is exposed.

The matrix-carriage is moved positively by the pawls $v^3$ $v^4$, and when the characters of any given line have been all brought to the impression-point the matrix-carriage is automatically returned to its initial position by means of a weighted cord $w$. At the same time the dummy-slide is also returned to its initial position. The devices for releasing the dummy and matrix-carriage will now be described.

Referring to Figs. 2 and 4, $x$ indicates a slide moving in guides $x'$ under a fixed cross-piece $x^2$. The forward end of this slide carries a loosely-pivoted lever $x^3$, the ends of which are opposite the central or normally open channels $m^3$ $n^3$. In these channels are pins $x^4$, which are forced back against the lever $x^3$ when the pivot-pins M N travel down said central channels. It will be seen that when only one of the pins M N travels down the central channel the lever $x^3$ will be simply rotated on its pivot without affecting the slide $x$; but if the pins M N travel in their central channels simultaneously both ends of the lever $x^3$ will be forced back by the pins $x^4$ and the slide $x$ will be moved. This occurs after the last character of a line has been written and there are no more pins in the dummy set to move the switch-pins. Upon the rear end of the slide $x$ is mounted a lever $x^5$, the rear end of which abuts against an arm $x^6$ upon a rock-shaft $x^7$. A second arm $x^8$ of said rock-shaft lies normally under the holding-pawl $p^6$ of the dummy and a third arm $x^9$ stands adjacent to the holding-pawl $v^4$ of the matrix-carriage. Immediately after the last character of a line has been brought to the impression-point the pins N M travel down the central channels $n^3 m^3$ and force the slide $x$ back. The forward end of the lever $x^5$ drops down behind the fixed stop $x^2$ by virtue of a spring $x^{10}$, thus holding the slide $x$ in its rearward position. Meantime the rear end of the lever $x^5$, through the rock-arm $x^6$, rocks the shaft $x^7$, causing the arm $x^8$ to raise the pawls $p^5 p^6$ and release the dummy, the pawl $p^5$ having a projection $p^{11}$, which overlies the pawl $p^6$. The weighted cord $p^4$ immediately returns the dummy to its initial position, where it remains until the starting-key is operated to again lower the pawls $p^5 p^6$. The lever $x^3$, which only operates when pressed equally at both ends, I shall term an "equalizing-lever," and the parts $x^5$ to $x^{10}$ or their equivalents I shall term a "trip" device. When the dummy-pawls are raised, the matrix-feed pawls $v^3 v^4$ are also thrown out of engagement with the ratchet-wheel $v^2$ and the weighted cord $w$ returns the matrix-carriage to its initial position. Y is a starting-key upon a lever $y$, the rear end of which lies under the lever $x^5$. When the representation of a new line has been transferred from the duplicate dummy to the dummy proper, the starting-key is pressed and the starting-lever $y$ releases the forward end of the lever $x^5$ from the stop $x^2$, thus permitting the spring $x^{11}$ to draw the slide $x$ forward. The forward movement of the slide $x$ permits the rock-shaft $x^7$ to turn, the pawls $p^5 p^6$ to drop into engagement with the dummy-ratchet, and the pawls $v^3 v^4$ to engage with the matrix-feed wheel $v^2$. The pawls $p^5$ and $v^3$ are constantly in motion whether in engagement with the ratchets or not.

Figure 3:
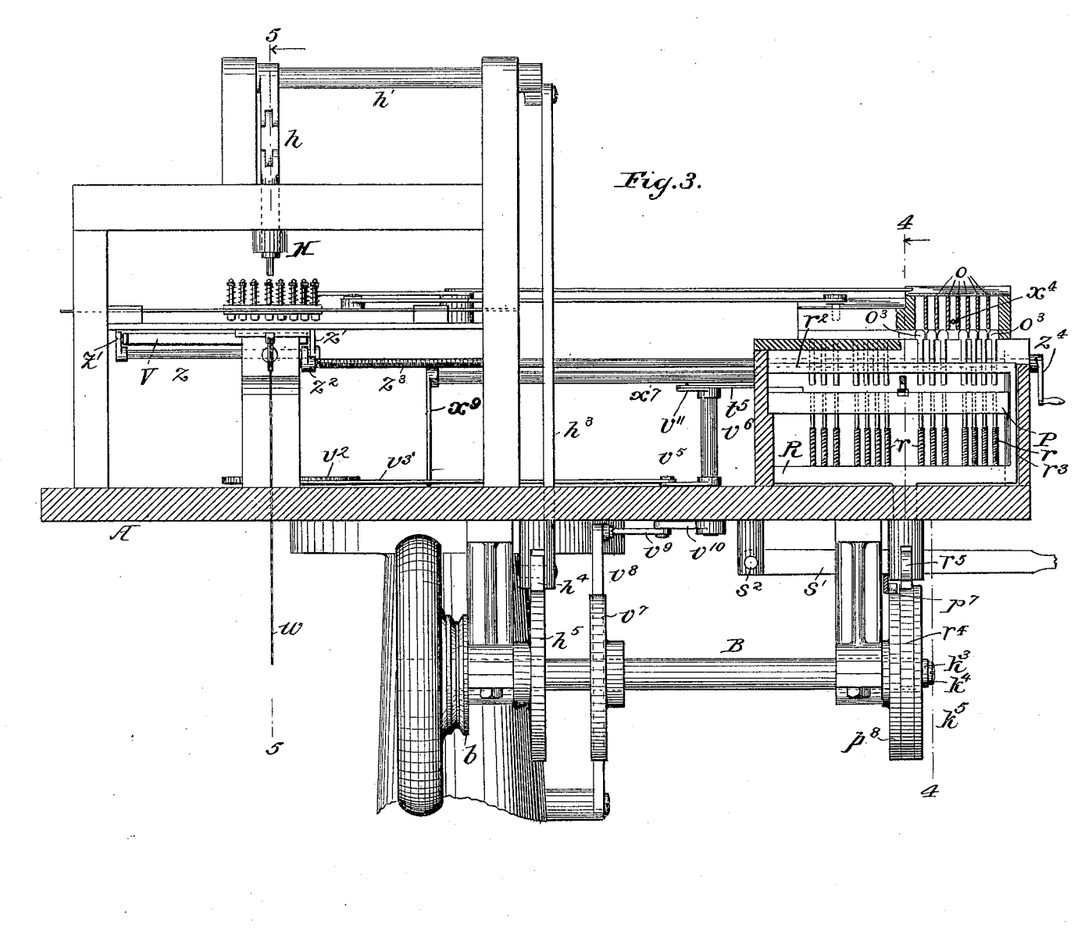
Fig. 3 is a sectional elevation taken on the line 3 3 of Fig. 2.

Any suitable devices may be used to effect the movement of the matrix-carriage to space between lines. As shown in Fig. 3, the carriage is embraced by arms $z' z'$ of a yoke-shaft $z$, while a third arm $z^2$ of said yoke-shaft has a threaded opening, through which passes a feed-screw $z^3$, adapted to be turned by a crank $z^4$. By the proper movement of the crank the carriage may be moved to effect any desired space between lines.

The operation of the machine need only be stated briefly in view of the foregoing detailed description. The power-shaft is kept constantly rotating and most of the connected portions of the machine are kept in constant motion. For this reason there is very little shock or resistance when the remaining parts, consisting chiefly of the dummy and the matrix-carriage, are thrown into action by the starting-key. After a duplicate dummy is placed in position it is raised and its representation is transferred to the dummy proper by slightly elevating the proper pins of said dummy. The starting-key is then pressed, which releases the slide $x$, rocks the shaft $x^7$, and permits the driving-pawls of the matrix-carriage and the dummy to come into action. At each revolution of the driving-shaft the following cycle of operations takes place: The driving-pawls $v^3$ of the matrix-carriage are drawn back by the spring $v^{12}$ until it is limited by the pin of the dummy which represents the proper space for the next letter. The frame R, carrying the flexible plungers, is then raised, forcing up the pin or pins of the dummy which represent the first letter and the corresponding switch-pins. While the switch-pins remain elevated the cross-head K draws the guide-pins N M along the channels of the elevated switch-pins, thus locating the proper die at the impression-point, and while the die remains at the impression-point the plunger comes down and forces it into the matrix material. After the impression of the die the guide-pins N M are returned to the forward end of the main channel, which is the common end of all the channels, and the central point of the group of dies is brought under the plunger. At the same time the rock-shaft $v^6$ is operated by its cam and the matrix is fed forward the width of the letter just impressed. Another row of pins in the dummy is then brought over the flexible plungers, and the above cycle of operations is repeated and will continue to be repeated until a row of pins in the dummy, none of which have been raised, is brought over the flexible plungers. As pins are raised for each character and space in the line, it follows that immediately after the last character has been printed a line of pins, none of which have been raised, will be brought to the flexible plungers. The effect of this is that all of the plungers are pushed aside, none of the switch-pins are raised, none of the side guides are opened, and the guide-pins M N travel down the central normally operative or open channels and push back the slide $x$. The slide $x$ rocks the shaft $x^7$ and releases the dummy and the matrix-carriage from their pawls and permits them to return to their initial positions preparatory to starting a new line.

Having described my invention, what I claim, and desire to secure by Letters Patent, is—

1. In a matrix-making or similar machine, the combination with a movable bank of dies, of two sets of die-selecting guides, each set of guides having a middle guide which is normally operative and guides upon both sides of said middle guide, and means for bringing any of the side guides into communication with the middle guide, substantially as described.

2. In a matrix-making or similar machine, a die-carrier frame movable in a plane, two sets of die-selecting guides, each set of die-selecting guides having a normally operative middle guide and normally inoperative guides on both sides thereof, means for bringing the side guides into communication with the middle guide, and connections between the die-carrier frame and said guides, the guides on opposite sides of the middle guides being constructed to throw the die-carrier frame in opposite directions from the printing-point respectively, substantially as described.

3. In a matrix-making or similar machine, a die-carrier frame movable in a plane, in combination with a pair of links, each link having its inner end connected to the die-frame, and two series of guides for controlling the movements of said links and die-frame, each of said series of guides having a middle guide normally operative upon the links and normally inoperative guides on both sides of the middle guide, and means for rendering said side guides operative upon the links, whereby the die-carrier frame may be moved in opposite directions from its central position, substantially as described.

4. In a matrix-making or similar machine, a die-carrier frame movable in a plane and normally located in a central position with relation to the impression-point, in combination with a pair of links, each link having its inner end connected with the die-frame, a series of guides for controlling the outer end of each link, said outer end being normally in engagement with the middle guide of the series, means for engaging the link with the side guide of the series, and means for vibrating the links with respect to the guides, the latter being stationary, substantially as described.

5. In a matrix-making or similar machine, a die-carrying frame movable in a plane and normally located in a central position with relation to the impression-point, in combination with a pair of vibrating links each link having its inner end connected with the die-frame and its outer end normally controlled by a circular guide having a radius equal to the length of the link, side guides, and means for bringing the links under control of the side guides to shift the die-frame, substantially as described.

6. In a matrix-making or similar machine, a die-carrying frame movable in a plane and normally located in a central position with relation to the impression-point, in combination with a pair of links, each link having its inner end connected with said die-frame, and its outer end controlled by a set of guides, the middle guide of each set being circular with a radius equal to the length of the link, and the side guides being connectible with the middle guide by means of switches, substantially as described.

7. In a matrix-making or similar machine, a die-carrying frame movable in a plane and normally located in a central position with relation to the impression-point, in combination with a pair of links, each link having its inner end connected with the die-frame and its outer end connected with a constantly-reciprocating part by a second link, pins M, N, connecting said links, and two sets of grooves for guiding said pins, the middle groove of each set being circular and the side grooves of each set being connectible with the middle groove by means of switches, substantially as described.

8. The combination of a secondary frame sliding in guides in the main frame, a die-frame sliding in guides in the secondary frame, a pair of links, one connected with each of said frames, and two sets of grooves for guiding the outer ends of said links, the middle groove of each set being circular with a radius equal to the length of the links, and the side grooves of each series being connectible with the middle grooves by switches, substantially as described.

9. The combination with a constantly-moving impression-plunger, of a die-frame having a blank space at its center normally under said plunger and a group of dies surrounding said space, a pair of constantly-vibrating links having their inner ends connected with the die-frame and their outer ends normally guided in circular guides, switches, and guides upon both sides of each of said circular guides connectible with the same by means of said switches, whereby as the links are vibrated the die-frame remains stationary excepting when the switches of the side guideways are operated, substantially as described.

10. The combination with a constantly-reciprocating cross-head, of a pair of links connected to said cross-head, a die-frame movable within and with a secondary frame, a pair of links connected with the die-frame, guide-pins connecting the cross-head links with the die-frame links, two sets of grooves in which said guide-pins work, and switching devices to throw the guide-pins into any desired grooves, substantially as described.

11. The combination with the die-frame, the links connected with the frame and provided with guide-pins, of the grooves formed by movable switch-rails for guiding the pins on the links, and the switch-pins, and devices for projecting the switch-pins into the grooves to open the same, substantially as described.

12. In a machine of the class described, the combination with the dummy comprising a plate or block having a series of movable pins, of a flexible plunger arranged to be deflected by pins in their normal position and to complete the movement of pins which have been partially moved, substantially as set forth.

13. In a machine of the class described, the combination with a dummy having a step-by-step movement and provided with a series of rows of movable pins normally depressed, of a frame and a set of flexible plungers carried thereby, said plungers being arranged in line with and in the paths of the rows of pins in the dummy, substantially as set forth.

14. In a machine of the class described the combination with the sets of guides and the switch-pins for controlling said guides, of the dummy having movable pins and the flexible plungers arranged beneath the switch-pins, said dummy being adapted to move between the plungers and the switch-pins, substantially as described.

15. In a machine of the class described the combination with a dummy having movable pins, of the coiled-wire flexible plungers, substantially as described.

16. In a machine of the class described the combination with the dummy proper, of a series of removable and interchangeable duplicate dummies, each having parts capable of representing the characters and spaces of a line of print substantially as set forth.

17. In a machine of the class described the dummy having rows of pins adapted to represent proper spacing, said spacing-pins being arranged in transverse guide-grooves, of the feeding device having an arm adapted to be projected into said guide-grooves against the spacing-pins to limit the movement of the spacing device, substantially as set forth.

18. In a machine of the class described, the combination with devices for selecting types or dies, of a trip device for throwing parts out of action, and an equalizing-lever adapted to operate in conjunction with certain selecting devices and to remain inoperative when other selecting devices are in use, substantially as described.

19. In machines of the class described, the combination with a series of guides, of a trip device for throwing parts out of action, and an equalizing-lever adapted to be operated in connection with selected guides and to remain inoperative when other guides are in use, substantially as described.

20. In machines of the class described, the combination with two series of guides, switches for bringing selected guides into action, a trip device for throwing parts out of action, an equalizing-lever upon the trip device, and pins interposed between two of the guides and opposite ends of the lever, substantially as described.

21. In machines of the class described, the combination with the vibrating levers, the guide-pins upon the outer ends of the levers, the sets of guide-grooves, and the pins in the normally open grooves, of the slide, the equalizing-lever on the slide, and devices connected with the slide for throwing the dummy feed-pawls out of action, substantially as set forth.

22. In machines of the class described, the combination of the constantly-rotating power-shaft, the dummy and matrix-feed pawls constantly operated thereby, the rock-shaft having arms adapted to raise said feed-pawls out of action, the arm $x^6$ upon said shaft, the slide $x$, the lever $x^5$ upon said slide adapted to contact with arm $x^6$, the fixed stop $x^2$ for said lever, and the starting-key for releasing said lever from said stop, substantially as set forth.

23. In a matrix-making or other composing machine, a movable font of dies arranged in rows and normally central with respect to the impression-point, in combination with a set of guides corresponding in number to the rows of dies, the middle guide being normally operative, means for rendering the side guides operative, and connections from the guides to the font of dies, substantially as described.

24. In a matrix-making or other composing machine, the combination with a movable die-carrier provided with a font of dies arranged in rows in two directions, of two sets of guides and connections between the guides and the die-carrier, the number of rows of dies in each direction being equal to the number of guides in each set respectively, substantially as described.

In testimony whereof I affix my signature in presence of two witnesses.

FRANK AMOS JOHNSON.

Witnesses:
J. S. BRAND,
R. H. SANFORD.